J. L. SMITH.
Sirup Filter.
No. 3,156. Reissued Oct. 6, 1868.
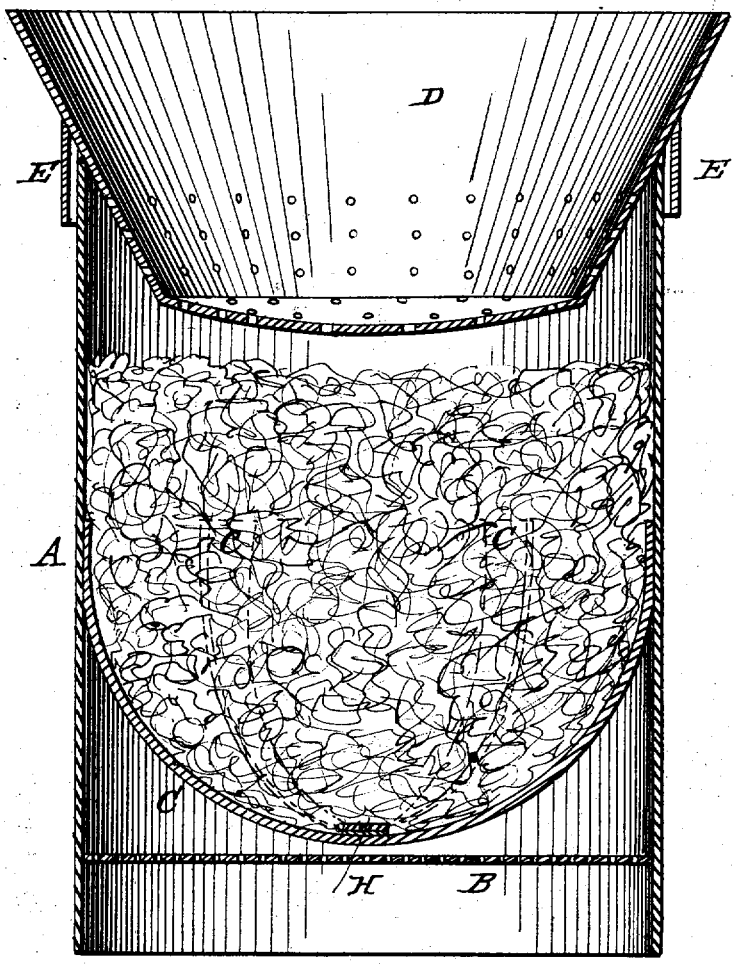
WITNESSES
J. Wm. Mason
John P. Jacobs
INVENTOR
James L. Smith
for
C. M. Alexander
Atty
N. PETERS, Photo-Lithographer, Washington, D. C.

United States Patent Office.

MARVIN, WASHBURN & CO., OF ALTON, ILLINOIS, ASSIGNEES OF JAMES L. SMITH.

*Letters Patent No.* 53,693, *dated April* 3, 1866; *reissue No.* 3,156, *dated October* 6, 1868.

IMPROVEMENT IN SIRUP-FILTERS.

The Schedule referred to in these Letters Patent and making part of the same.

TO ALL WHOM IT MAY CONCERN:

Be it known that JAMES L. SMITH, of Tuscola, Illinois, invented certain new and useful Improvements in "Sirup and other Filters;" and we hereby declare that the following is a full, clear, and exact description thereof, reference being had to the accompanying drawings, and to the letters of reference marked thereon, making a part of this specification.

The annexed drawings represent a longitudinal vertical section of the sirup-filter.

A represents the body of the filter, which may be made in a cylindrical or other suitable form, of metal or wood, and of any convenient size. B represents a perforated sieve, placed near the bottom of the body, A, while D represents a funnel-shaped sieve at the top portion of the body, which is perforated at its sides and bottom, and is provided with flanges E E, which overlap the top of the body, A, for connecting said sieve to the body, and form a cap for the same.

Within the Body, below the sieve, D, is placed raw wool, F, which is found to be one of the best known filters.

This wool is suspended by means of three or more curved metal braces, C C C, which are secured to and extend from side to side of the body, crossing each other at the point H, just above the lower sieve B.

The sirup, oil, liquid, or other article to be filtered is first placed within the topmost sieve, D, and passes through its perforations, retaining the larger foreign particles, thence on to the wool, F, where the said wool retains the small pieces of cane (when filtering sirup) and the other foreign matter, when filtering other than sirup, and then to the lower sieve, B, and through it into the vessel or receiver in a perfect filtered state.

The filtering of sirup by this invention not only removes the particles of foreign matter, but causes the sirup or other liquid to be more clear, and gives it a finer flavor than by the ordinary filtering process.

The braces C, being semicircular in form, as well as radial, are used to suspend the wool, so as to leave as much space between each other as possible, to allow the filtering-material to pass freely through, and thereby use little material in the construction of the filter, the wool being of that tenacious material, needs but few devices to suspend it above the lower sieve far enough merely to prevent its resting thereon.

Having thus fully described the invention, what is claimed as new, and desired to be secured by Letters Patent, is—

The filter herein described, composed of raw wool F, suspended between the funnel or other-shaped sieve D and sieve B, in the skeleton hemispherical frame H C, within a suitable case, A, for sirup, oil, liquors, and fluids, all substantially as specified.

B. R. HAWLEY.
ELMER WASHBURN.
C. A. MONTROSS.
J. L. MARVIN.

Witnesses:
C. M. ALEXANDER,
J. M. MASON.